United States Patent [19]
Mitchell

[11] 4,373,912
[45] Feb. 15, 1983

[54] AIRSTREAM HEATER
[76] Inventor: Edward J. Mitchell, 225 Stapleton Dr., Prarie Grove, Ark. 72753
[21] Appl. No.: 232,353
[22] Filed: Feb. 6, 1981
[51] Int. Cl.³ .......................... F24H 1/00; F23M 9/00; F23C 5/06
[52] U.S. Cl. .................................... 432/222; 431/185; 431/186
[58] Field of Search ....................... 432/219, 222, 223; 431/185, 186

[56] References Cited
U.S. PATENT DOCUMENTS 2,044,296 6/1936 Hardgrove ........................... 431/185
3,211,439 10/1965 Fahlberg .............................. 432/223
4,278,423 7/1981 Siccardi ................................ 432/222

Primary Examiner—John J. Camby
Attorney, Agent, or Firm—Boyd D. Cox

[57] ABSTRACT

An improved airstream heater comprising a heater housing with a heating chamber through which an airstream to be heated is forced by airstream movement means, air turbulence creating means within the heater housing to create controlled air turbulence within the heating chamber for rapid and uniform heating of the airstream, and a burner which disperses its flame so as to rapidly and uniformly heat the airstream.

5 Claims, 5 Drawing Figures

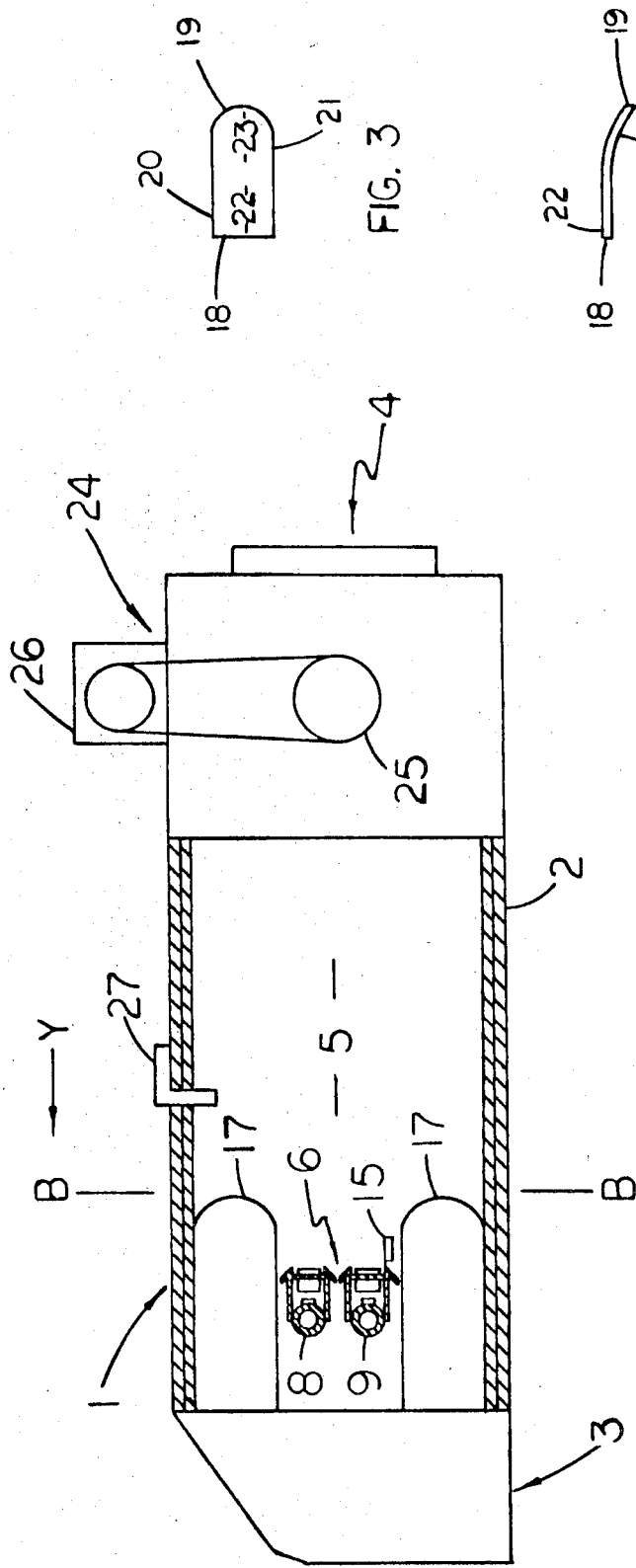
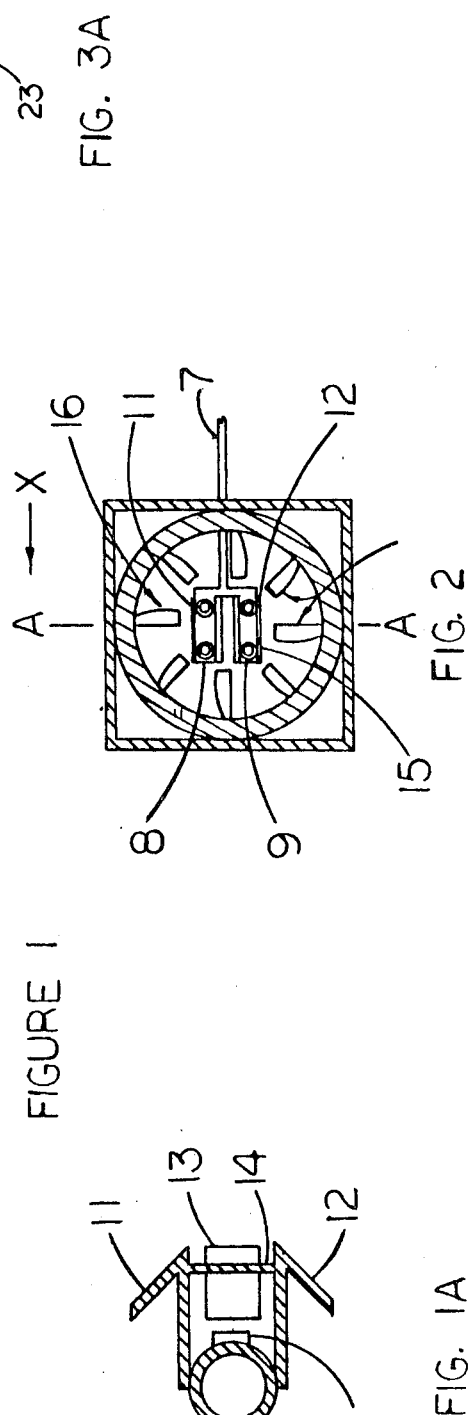

AIRSTREAM HEATER

BACKGROUND OF THE INVENTION

This invention relates in general to an airstream heater and more particularly to a heater having a gas burner for heating an airstream from within the airstream.

The direct heating of an airstream by means of an airstream burner yields particularly desirous results, especially for certain applications. Dry, fresh air can be introduced into an area when cold outside air is introduced into the heater. When the area of introduction is a greenhouse, better plant growth can be achieved. This is in part due to the fact that fresh air and good ventilation is provided. Also, the amount of insects and bacteria are reduced by the presence of warm, dry fresh air. In fact, during cold weather, many greenhouses heated by other means experience a condition known as "damp off". This occurs when an inordinate amount of condensation forms in the greenhouse which contributes to root rot of the plants therein. The dry air from a heater as described above can eliminate this problem.

When the area of introduction is a chicken house, better bird growth can be achieved. As with the greenhouse application, good ventilation is afforded and the dry fresh air reduces the presence of harmful bacteria. Also, the amount of ammonia produced from the bird droppings within the building can be reduced and building sweating can be eliminated. All this provides an environment for the birds which stimulates their appetites and gives better feed conversion. One way this is achieved is by the dry heat promoting more water consumption and greater growth rates. Additionally, the heater itself is safer than conventionally used chicken house heaters. No open flame is utilized as with the conventional heaters in what is normally a high risk fire area with materials such as loose straw and methane generally present.

Other areas can be heated by means of direct contact type heaters with similarly beneficial results. However, to efficiently and effectively heat any area with such type heater, the heating of the airstream must be rapid and thorough. This is a particularly difficult endeavor when the flow rate of the airstream is high which is generally desirable so that the heating unit will not have to operate as long to heat a given area. Problems often encountered are maintenance of the burner flame in the airstream and inadequate temperature rise of the airstream within the heater. To overcome such type problems, rather complex structures have been proposed. One such structure is disclosed in U.S. Pat. No. 4,023,923 to Kramer.

SUMMARY OF THE INVENTION

One of the principal objects of the instant invention is the provision of an airstream heater that will rapidly and uniformly heat an airstream.

Another object of the present invention is the provision of an airstream heater that will efficiently and effectively heat a fast moving airstream.

Still another object of this invention is the provision of an airstream heater which will create adequate turbulence in the airstream for rapid and uniform heating.

A still further object of this invention is to provide an airstream heater with a burner that will dispose its flame so as to rapidly and uniformly heat an airstream.

The heater of this invention has a heater housing with a heating chamber through which an airstream to be heated is forced by airstream movement means such as a fan. As the airstream is forced into the heating chamber it passes through air turbulence creating means such as a plurality of air blades to create controlled air turbulence within the heating chamber for rapid and uniform heating of the airstream. In addition, as the airstream is forced into the heating chamber, the airstream passes around a burner which disperses its flame so as to rapidly and uniformly heat the airstream. Consequently, the heater heats the airstream in an efficient and effective manner.

Other objects, features and advantages of the present invention will become apparent from a consideration of the following detailed description and from the accompanying drawings.

DESCRIPTION OF THE DRAWINGS

FIG. 1 is a diagrammatic partial cross-sectional side view taken along line A—A in the direction of arrow X of the heater of the present invention.

FIG. 1A is an enlargement of the circled portion of the burner of the heater.

FIG. 2 is a diagrammatic cross-sectional end view taken along line B—B in the direction of arrow Y of the heater.

FIG. 3 is a side view of an air blade of the present invention.

FIG. 3A is a top view of an air blade of the present invention.

DETAILED DESCRIPTION

Referring now to the drawings, FIG. 1 depicts a preferred embodiment of the present invention. The airstream heater 1 comprises a heater housing 2 constructed of sheet metal or other heat withstanding material. The heater housing 2 has an air inlet 3 near its upstream end and an air outlet 4 near its downstream end. Between the air inlet 3 and air outlet 4 is a heating chamber 5, preferably circularly tubular, having a longitudinal axis generally parallel to the direction of air flow through the heating chamber 5. A burner 6 is located within the heating chamber 5 near its longitudinal axis at the proximate downstream end thereof. A fuel line 7 is connected to the burner 6 to supply a combustible substance, preferably natural gas, to the burner to be ignited when mixed with the airstream in the heating chamber 5.

In this preferred embodiment, the burner 6 has two fuel conduits 8 and 9 communicating with the fuel line 7 and extending therefrom with the longitudinal axis of fuel conduits 8 and 9 being generally perpendicular to the longitudinal axis of the heating chamber 5. On the fuel conduits 8 and 9 are plurality of fuel ports 10 to direct the combustible substance generally toward the downstream end of the heating chamber 5. In addition, the fuel conduits 8 and 9 each have first and second baffle means 11 and 12. For each fuel conduit, a first baffle means 11 is adjacent the fuel conduit for the approximate length thereof and extends from the fuel conduit in a direction generally toward the downstream end of heating chamber 5, then bends back toward the upstream end of the heating chamber 5 and away from the fuel conduit. Also for each fuel conduit, a second baffle means 12 is adjacent the fuel conduit for the approximate length of the fuel conduit at the portion of the fuel conduit approximately opposite the portion of the fuel conduit where the first baffle means 11 adjoins the fuel conduit and extends from the fuel conduit in a direction generally toward the downstream end of the heating chamber 5, then bends back toward the downstream end of the heating chamber 5 and away from the fuel conduit.

Each of the fuel ports 10 of the burner 6 has a corresponding tubular member 13, preferably circularly tubular, being positioned so as to have the passageway therethrough aligned with its corresponding fuel port 10 to further direct the combustible substance generally toward the downstream end of the heating chamber 5. Furthermore, each tubular member is adjustably mounted between baffle means 11 and 12 to allow for adjustment in the direction generally parallel to the longitudinal axis of the heating chamber 5 so that the distance between the upstream end of the tubular member 13 and the conduit of the corresponding fuel port 10 can be varied to allow for varying amounts of air being mixed with the combustible substance within the tubular member 13. In this embodiment of the present invention, tubular members 13 are threaded through corresponding openings in mounting brackets 14, a mounting bracket 14 being fixedly attached between each set of first and second baffle means 12 and 13 and extending the approximate length thereof. With the tubular member 13 being so mounted, they can be rotated in one direction to increase the distance of their upstream ends from the fuel conduits and rotated in the other direction to reduce such distance.

The burner 6 is provided with a pilot flame ignition system 15 for the lighting thereof. This system can be of any suitably operable type. One such system is a Dayton Fuel-Trimmer gas pilot ignition system.

Air turbulence creating means 16 are situated within the heater housing 2 generally around the burner and longitudinal axis of the heating chamber 5 to create controlled turbulence within the heating chamber 5 to facilitate rapid and uniform airstream heating. According to this preferred embodiment of the present invention the air turbulence creating means is a plurality of air blades 17, positioned radially around the burner and the longitudinal axis of the heating chamber 5. As shown particularly in FIGS. 3 and 3A, each air blade 17 has an upstream end 18, a downstream end 19, an exterior edge 20, an interior edge 21, a straight section 22 and a curved section 23. The straight section 22 of the air blade 17 extends from the upstream end 18 thereof to the proximate center point between such upstream end 18 and the downstream end 19 thereof, and the curved section extends from such center point to the downstream end 19.

As seen in FIG. 1, the upstream end 18 of each air blade 17 is slightly closer the upstream end of the heater housing 2 than any portion of burner 6 and the downstream end 19 of each air blade 17 is slightly closer the downstream end of the heater housing 2 than any portion of burner 6. The exterior edge 20 of the straight section 22 of each air blade 17 is adjacent the interior of the heater housing 2, with the interior edge 21 of such straight section 22 being generally directed toward the longitudinal axis of the heating chamber 5. The curved section 23 of each air blade 17 curves laterally (See FIG. 3A) from the proximate center point between the upstream end 18 and downstream end 19 of the air blade 17 to its downstream end 19, with each air blade 17 curving laterally in the same direction.

The airstream heater 1 also comprises airstream movement means 24 (see FIG. 1) to force air into the air inlet 3, through the heating chamber 5 and out the air outlet 4 of the heating housing 2. In this preferred embodiment of the invention, the air movement means 24 include a fan 25 driven by an electric motor 26. The operation of the fan is regulated by a fan and limit controller 27. Although the fan and limit controller may be of any suitable type, one acceptable type is No. L 40643 of the Honeywell Tradeline series.

In operation, a thermostat (not shown) at a set temperature calls for heat from the airstream heater 1 and creates a flow of electricity to the pilot flame ignition system 15 which produces a pilot light. The heat from the pilot light activates a sensor (not shown) that opens a gas valve (not shown) in the fuel line 7. Consequently, the burner 6 ignites and the temperature in the heating chamber 5 rises. When the heating chamber 5 reaches a preselected temperature, the fan and limit control 27 turns on the fan 25 which forces air into the air inlet 3, through the heating chamber 5 and out the air outlet 4. The fan 25 continues to force heated air out the air outlet 4 until the aforementioned thermostat senses its upper temperature limit, at which time it turns off the gas valve in the fuel line 7. This causes the burner 6 and pilot light to extinguish and the heating chamber 5 cools off with the fan 25 continuing to force air through the airstream heater 1. When the heating chamber 5 has cooled to the pre-selected temperature at which the fan 25 was started, the fan and limit control 27 shuts off the fan 25. The airstream heater 1 then sits at rest until the thermostat once more calls for heat and the just described process is repeated.

It is noted that for safety, the fan and limit control 25 will also shut the heater 1 off if the heating chamber 5 reaches a temperature determined too be the upper limit for the safe operation of the unit. This upper limit could be reached, for instance if the motor 26 malfunctioned making the fan 25 unoperational while the burner 6 was still lit. In such event, instead of the unit becoming increasingly hot, the fan and limit control 27 would shut off the gas valve in the fuel line 7 when it sensed the upper temperature limit for safe operation.

It is understood that the present invention is not limited to that precisely as described hereinabove. Many modifications and variations of this invention will be apparent to those skilled in the art. It is, therefore, intended that the scope of the invention be solely limited by the claims appended hereto.

I claim:

1. A heater for heating an airstream comprising:
   (a) a heater housing having an upstream end and a downstream end with an air inlet proximate the upstream end and an air outlet proximate the downstream end and a heating chamber situated between said air inlet and air outlet, said heating chamber having an upstream end and downstream end and a longitudinal axis generally parallel to the direction of air flow through said heating chamber;
   (b) a burner situated within the heating chamber proximate the longitudinal axis thereof and proximate the upstream end thereof, said burner having at least one fuel conduit at least one fuel port on each such conduit to direct flow of a combustible substance generally toward the downstream end of said heating chamber, a first baffle means for each said fuel conduit, said first baffle means being adjacent said fuel conduit and extending from the fuel conduit in a direction generally toward the downstream end of the heating chamber then bending back toward the upstream end of the heating chamber and away from said fuel port, a second baffle means for each said fuel conduit said second baffle means being adjacent said fuel conduit at the portion of the fuel conduit where the first baffle means adjoins said fuel conduit and extending from the fuel conduit in a direction generally toward the downstream end of the heating chamber then bending back toward the upstream end of the heating chamber and away from said fuel port, and a tubular member corresponding to each said fuel port mounted between the first baffle means and second baffle means so as to have the passageway through said tubular member aligned with the corresponding fuel port to further direct the combustible substance generally toward the downstream end of said heating chamber, said tubular member having an upstream end and downstream end and being adjustably mounted to allow for adjustment in the direction generally parallel to the longitudinal axis of said heating chamber so that the distance between the upstream end of the tubular member and the fuel conduit of its corresponding fuel port can be varied to allow for varying amounts of air being mixed with said combustible substance with said tubular member;

(c) a fuel line connected to said burner to supply said combustible substance to the burner to be ignited when mixed with the airstream and thereby heat the airstream in the heating chamber; and (d) airstream movement means to force air into the air inlet through the heating chamber and out the air outlet of the heater housing.

2. A heater according to claim 1 wherein the said combustible substance is in a gaseous state.

3. A heater according to claim 1 having air turbulence creating means situated within the heater housing generally around the burner and longitudinal axis of the heating chamber to create controlled turbulence within the heating chamber to facilitate rapid and uniform airstream heating.

4. A heater according to claim 3 wherein the air turbulence creating means is a plurality of air blades within the heater housing generally extending radially from the burner and the longitudinal axis of the heating chamber.

5. A heater for heating an airstream comprising:
(a) a heater housing having an upstream end and a downstream end with an air inlet proximate the upstream end and an air outlet proximate the downstream end and a heating chamber situated between said air inlet and air outlet, said heating chamber having an upstream end and downstream end and a longitudinal axis generally parallel to the direction of air flow through said heating chamber;

(b) a burner situated within the heating chamber proximate the longitudinal axis thereof and proximate the upstream end thereof;

(c) a fuel line connected to said burner to supply a combustible substance to the burner to be ignited when mixed with the airstream and thereby heat the airstream in the heating chamber;

(d) air turbulence creating means situated within the heater housing generally around the burner and longitudinal axis of the heating chamber to create controlled turbulence within the heating chamber to facilitate rapid and uniform airstream heating, said air turbulence creating means having a plurality of air blades positioned radially around the burner and the longitudinal axis of the heating chamber, each said air blade having an upstream end, a downstream end, an exterior edge, an interior edge, a straight section from the upstream end thereof to the proximate center point between the upstream end and downstream end thereof, and a curved section, from such center point to the downstream end thereof, the upstream end of each air blade being slightly closer the upstream end of said heater housing than any portion of said burner, the downstream end of each air blade being slightly closer the downstream end of said heater housing than any portion of said burner, the exterior edge of the straight section of each air blade being adjacent the interior of the heater housing, the interior edge of the straight section of each air blade being generally directed toward the longitudinal axis of the heating chamber, the curved section of each air blade curving laterally from its said proximate center point to the downstream end thereof, and each air blade curving laterally in the same direction; and (e) airstream movement means to force air into the air inlet through the heating chamber and out the air outlet of the heater housing.

* * * * *